United States Patent
Kurose et al.

(10) Patent No.: US 6,514,638 B2
(45) Date of Patent: *Feb. 4, 2003

(54) NON-AQUEOUS ELECTROLYTE SECONDARY BATTERY INCLUDING POSITIVE AND NEGATIVE ELECTRODES

(75) Inventors: Shigeo Kurose, Saku (JP); Tadayoshi Iijima, Saku (JP); Tetsuya Takahashi, Kitasaku-gun (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,639
(22) PCT Filed: May 27, 1998
(86) PCT No.: PCT/JP98/02317
§ 371 (c)(1),
(2), (4) Date: Nov. 17, 1999
(87) PCT Pub. No.: WO98/54778
PCT Pub. Date: Dec. 3, 1998

(65) Prior Publication Data
US 2002/0012841 A1 Jan. 31, 2002

(30) Foreign Application Priority Data
May 27, 1997 (JP) .............................. 9-136665

(51) Int. Cl.$^7$ .............................................. H01M 10/34
(52) U.S. Cl. ................. 429/60; 429/231.95; 429/231.1; 429/231.3; 429/221; 429/223; 429/224; 29/623.1
(58) Field of Search ................................ 429/221, 223, 429/224, 231.1, 231.3, 60, 231.95; 29/623.1

(56) References Cited

U.S. PATENT DOCUMENTS

| | | | | |
|---|---|---|---|---|
| 5,393,622 A | * | 2/1995 | Nitta et al. | 429/223 |
| 5,576,121 A | | 11/1996 | Yamada et al. | 429/220 |
| 5,686,203 A | * | 11/1997 | Idota et al. | 429/194 |

(List continued on next page.)

FOREIGN PATENT DOCUMENTS

JP    07-153494    *    6/1995

OTHER PUBLICATIONS

Abstract of Japanese Patent Publ. No. 09190822; dated Jul. 22, 1997.
Abstract of Japanese Patent Publ. No. 06295725; dated Oct. 21, 1994.
Abstract of Japanese Patent Publ. No. 06290811; dated Oct. 18, 1994.
Abstract of Japanese Patent Publ. No. 05290847; dated Nov. 5, 1993.

*Primary Examiner*—Laura Weiner
(74) *Attorney, Agent, or Firm*—Rader, Fishman & Grauer PLLC

(57) ABSTRACT

A non-aqueous electrolyte secondary battery having a large capacity with improved charge/discharge characteristics is provided.

The non-aqueous electrolyte secondary battery is fabricated by combining a positive electrode (4) and a negative electrode (2) so that the relationship:

$$0.9 \leq Kp/Kn \leq 1.1$$

is satisfied, where an initial efficiency of the positive electrode (4) is represented by Kp and an initial efficiency of the negative electrode (2) is represented by Kn. An active material of the positive electrode (4) preferably contains a lithium composite oxide having a composition of $Li_xNi_yM_zO_2$ (0.8<x<1.5, 0.8<y+z<1.2, 0≦z<0.35; M is at least one element selected from Co, Mg, Ca, Sr, Al, Mn and Fe).

9 Claims, 2 Drawing Sheets

U.S. PATENT DOCUMENTS 5,721,067 A * 2/1998 Jacobs et al. ................ 429/220
5,744,264 A * 4/1998 Barker ........................ 429/223
5,750,288 A * 5/1998 Xie et al. .................... 429/229
5,783,333 A * 7/1998 Mayer ........................ 429/223
5,789,107 A * 8/1998 Okada et al. ................ 429/192
6,037,095 A * 3/2000 Miyasaka .................... 429/223
6,045,771 A * 4/2000 Matsubara et al. ......... 429/223

* cited by examiner

NON-AQUEOUS ELECTROLYTE SECONDARY BATTERY INCLUDING POSITIVE AND NEGATIVE ELECTRODES

TECHNICAL FIELD OF THE INVENTION

The present invention relates to a non-aqueous electrolyte secondary battery, and more particularly to a non-aqueous electrolyte secondary battery having a large capacity with improved charge/discharge characteristics.

TECHNICAL BACKGROUND OF THE INVENTION

Recent development of devices in the electronic field is remarkable, and various devices such as video cameras, liquid crystal cameras, portable telephones, laptop computers, and word processors are now being developed. In accordance therewith, there are increasing needs for reduction in size and weight and achievement of high energy density in batteries that are to be used as power sources for these electronic devices.

Conventionally, lead batteries or nickel-cadmium batteries have been used for these electronic devices. These conventional batteries cannot sufficiently meet the needs for reduction in size and weight and achievement of high energy density.

Accordingly, there are proposed non-aqueous electrolyte batteries using a non-aqueous electrolytic solution containing a lithium salt dissolved in a non-aqueous solvent. As these non-aqueous electrolyte batteries, batteries in which a metal lithium, a lithium alloy, or a carbon material capable of being doped and undoped with lithium ions is used as a negative electrode material and a lithium cobalt composite oxide is used as a positive electrode material are already in practical use.

Having a high operation voltage of 3 to 4 V, the non-aqueous electrolyte batteries of this type can be made to have a high energy density and excellent cycle characteristics with only a small amount of self-discharge.

Also, in order to attain further reduction in size and weight and achievement of high energy density in these non-aqueous electrolyte batteries, eager researches for development of active materials and the like are now being carried out. As positive electrode active materials, Ni-containing lithium composite oxides such as lithium-nickel composite oxides and lithium-nickel-cobalt composite oxides are also proposed.

Meanwhile, Japanese Laid-open Patent Publication No. 5-290847/1993, for example, discloses use of $Li_{1+x}CoO_2$ as a positive electrode active material to provide lithium corresponding to the latent capacity thereof for precharging the negative electrode so as to increase the battery capacity. However, the battery capacity has not been sufficiently increased.

DISCLOSURE OF THE INVENTION

Objects of the Invention

On examining the capacity and the charge/discharge characteristics of a non-aqueous electrolyte secondary battery, the present inventors have found that it is not possible to improve the capacity and the charge/discharge characteristics of the battery as designed even if each of the capacities of the positive and negative electrodes is simply increased.

Accordingly, the object of the present invention is to solve the above-mentioned problems of the prior art and to provide a non-aqueous electrolyte secondary battery having a large capacity with improved charge/discharge characteristics.

Summary of the Invention

The present inventors have made an eager research and found out that a battery can have increased capacity and improved charge/discharge characteristics by observing each of the initial efficiencies of positive and negative electrodes and by combining the positive electrode and the negative electrode so that the initial efficiencies of the positive and negative electrode satisfy a specific relationship, thereby completing the present invention.

Accordingly, the present invention provides a non-aqueous electrolyte secondary battery including a positive electrode and a negative electrode each capable of being doped and undoped with lithium ions, wherein the positive electrode and the negative electrode are combined so that the relationship:

$$0.9 \leq Kp/Kn \leq 1.1$$

is satisfied, where an initial efficiency of the positive electrode is represented by Kp and an initial efficiency of the negative electrode is represented by Kn.

In the present invention, the initial efficiency Kp of the positive electrode is a ratio of a discharge capacity to a charge capacity when it is first charged to 4.2 V and then discharged to 3.0 V using lithium as a counter electrode. In other words, Kp=(initial discharge capacity)/(initial charge capacity).

The initial efficiency Kn of the negative electrode is a ratio of a charge capacity to a discharge capacity when it is first discharged to +0.0 V and then charged to 2.0 V using lithium as a counter electrode. In other words, Kn =(initial charge capacity)/(initial discharge capacity).

Although nickel-containing lithium composite oxide as an active material has a large capacity, its initial efficiency tends to be poorer than cobalt lithium oxide. Also, hard carbon and polymer carbon tend to have a larger capacity but with a poorer initial efficiency than an active material of graphite. In a conventional method, if the initial efficiencies of the positive electrode and the negative electrode are different, the one having the poorer initial efficiency is packed in a smaller amount to fabricate a battery, or alternatively the one having the better initial efficiency is loaded. If an attempt is made to increase the capacity, the initial charge/discharge capacities tend to be poorer. Conventionally, an improvement to increase the initial efficiency has been made. Also, in a conventional lead battery, for example, the concentration of an electrolyte in an electrolytic solution changes by charging and discharging. In a battery where electricity is produced by anions and cations in the electrolyte reacting with the positive electrode and the negative electrode, the capacity changes greatly according to the initial efficiency. Therefore, increased initial efficiency contributes to increase in the capacity.

However, in a lithium ion secondary battery, electricity is taken out by means of lithium ions moving between the positive electrode and the negative electrode, so that basically the concentration of the electrolyte in the electrolytic solution does not change. In other words, the electrolyte in the electrolytic solution is not consumed by charging or discharging. Therefore, it has been found out that it is not necessary to increase the initial efficiency with efforts but, rather, the initial efficiency ratio between the positive electrode and the negative electrode is important. Thus, the present invention provides a battery having a large capacity with improved charge/discharge characteristics by allowing the ratio of the initial efficiencies of the positive and negative electrodes to be within the above-mentioned specific range.

In the present invention, the active material of the positive electrode preferably contains a lithium composite oxide having a composition of $Li_xNi_yM_zO_2$ (where x satisfies 0.8<x<1.5, y+z satisfies 0.8<y+z<1.2, z satisfies 0≦z<0.35, and M is at least one element selected from Co, Mg, Ca, Sr, Al, Mn and Fe).

Detailed Description of the Invention

In the present invention, a lithium composite oxide is used as an active material of the positive electrode. Examples of the lithium composite oxides to be used include $Li_xCoO_2$ (0<x≦1.0), $Li_xN_iO_2$ (0<x≦1.0), $Li_{1+x}Mn_{2-x}O_4$ (0≦x≦⅓), $Li(M, Mn)_2O_4$ (M=Cr, Co, Al, B), and others.

In the present invention, it is particularly suitable in obtaining large capacity with low costs that the lithium composite oxide is $Li_xNi_yM_zO_2$ (where x satisfies 0.8<x<1.5, y+z satisfies 0.8<y+z<1.2, z satisfies 0≦z<0.35, and M is at least one element selected from Co, Mg, Ca, Sr, Al, Mn and Fe). In this case, the metal M is more preferably Co, and may be two or more kinds of the metals.

An example of a method for producing such a lithium composite oxide is, for example, a process in which a basic metal salt and an alkaline water-soluble lithium compound containing respectively an anion that volatilizes at the time of calcination of $LiMetal^{3+}O_2$ (where the Metal contains Ni as a major component and further contains at least one element selected from Co, Mg, Ca, Sr, Al, Mn, and Fe) are allowed to react in an aqueous medium to obtain a slurry, which is then dried and calcined.

The basic metal salt is represented by the general formula: $Metal^{2+}(OH)_{2-nk}(A^{n-})_k \cdot mH_2O$. Here, the $Metal^{2+}$ is an ion containing Ni as a major component and possibly containing at least one element selected from Co, Mg, Ca, Sr, Al, Mn and Fe. $A^{n-}$ represents an anion with n valences (where n=1 to 3) such as a nitrate ion, a chloride ion, a bromide ion, an acetate ion, or a carbonate ion. Further, k satisfies 0.03≦k≦0.3; and m satisfies 0≦m<2.

The basic metal salt represented by the above-mentioned formula can be produced by adding to an aqueous solution of $Metal^{2+}$ an alkali of about 0.7 to 0.95 equivalent, preferably about 0.8 to 0.95 equivalent, relative to the $Metal^{2+}$, and reacting them under a reaction condition of about 80° C. or less, and then maturing the reaction product at a temperature of 40° C. to 70° C. for 0.1 to 10 hours, followed by washing with water to remove the by-products. The alkali to be used in the reaction may be a hydroxide of an alkali metal such as sodium hydroxide, a hydroxide of an alkali earth metal such as calcium hydroxide, an amine, or the like.

A basic metal salt selected from the compounds represented by the above-mentioned formula and one or more lithium compounds selected from lithium hydroxide, lithium carbonate, hydrates thereof, and the like are allowed to react in water at a concentration in the range of 5 to 25 wt % and at a temperature in the range from room temperature to 100° C. to obtain a slurry, which is then subjected to spray drying for improvement of uniformity in the shape of the composition to be obtained.

The lithium composite oxide can be obtained by subjecting the dried product to a thermal treatment for calcination in an oxidizing gas atmosphere containing air, oxygen, ozone, or the like in a temperature range of about 700 to 1000° C. for about 0.1 to 20 hours.

Another example of a method for producing a lithium composite oxide to be used in the present invention is a process that uses a water-soluble lithium compound and a basic metal carbonate obtained from a water-soluble metal compound.

The water-soluble metal compound to be used in this process is a nitrate, a sulfate, a metal chloride, or the like. This water-soluble metal compound may contain a nickel compound as a major component and may be mixed with a given amount of another water-soluble metal compound so that at least one element selected from Co, Mg, Ca, Sr,, Al, Mn and Fe may be blended therewith.

The basic metal carbonate may be obtained by filtrating and drying a precipitate obtained by allowing a mixture of the above-mentioned water-soluble metal compounds to react with a compound selected from the group consisting of an alkali carbonate, an alkali bicarbonate, ammonium carbonate and ammonium bicarbonate in water, or a precipitate obtained by allowing sodium hydroxide to be present for reaction in the above-mentioned reaction system. In this case, in order to produce a good precipitate, it is preferable to use a little excessive amount of the carbonate, and also it is important to control the stirring condition so as to control the specific surface area of the precipitate.

To the basic metal carbonate thus obtained, a powder of a water-soluble lithium compound such as lithium carbonate or lithium hydroxide is added at a desired ratio of the metal to Li. The resultant mixture in a powder state is first heated to 300 to 500° C. in the presence of an inert gas or an oxygen-containing gas. This heating allows only the decomposition of the basic metal carbonate to proceed, whereby carbonic acid gas in the crystal structure is released. This heating is continued until the generation of the carbonic acid gas substantially stops so as to convert all of the basic metal carbonate into a metal oxide having numerous fine pores.

After the generation of carbonic acid gas substantially stops, the temperature is further raised to allow the molten water-soluble lithium compound to penetrate into the fine pores of the metal oxide, whereby the two compounds will be in an extremely close contact. At this moment, the resultant product is calcined at a temperature of 700 to 900° C. in the presence of oxygen gas or an air rich in oxygen, whereby Ni is turned from bivalent to trivalent to produce a Li composite oxide.

Here, the larger the specific surface area of the basic metal carbonate to be used is (for example, more than 100 m²/g), the more preferable it is, because gas discharge and generation of fine pores after preliminary calcination will be more efficiently performed.

A positive electrode mixture-coating material is prepared by kneading such a positive electrode active material, an electrically conductive agent such as acetylene black or graphite, and a binder such as polytetrafluoroethylene or polyvinylidene fluoride together with an organic solvent such as N-methyl-2-pyrrolidone. The coating material is applied onto a collector such as aluminum foil and dried to obtain the positive electrode. The electrically conductive agent, the binder, the organic solvent and the collector are not specifically limited, and may be selected from a variety of materials.

Now, the negative electrode active material to be used in combination with such a positive electrode active material will be hereafter explained.

The negative electrode active material is not specifically limited and may be any material capable of being doped and undoped with lithium, a lithium alloy, or lithium ions. Such a material may be a carbon material, tin oxide, or the like. Examples of the materials include graphites, glassy carbons, polymer carbons which are carbon materials obtained by thermally treating a high polymer having a cross-linked structure in an inert atmosphere (hard carbons obtained by carbonization of a synthetic resin such as cellulose, phenolic resin, furfural resin, polyparaphlenylene or polyacrylonitrile), and others. Especially, polymer carbon is suitable because it has a large capacity.

A negative electrode mixture-coating material is prepared by mixing and/or kneading such a negative electrode active material, an electrically conductive agent, and a binder together with an organic solvent. This coating material is applied onto a collector such as copper foil and dried to obtain the negative electrode. The electrically conductive agent, the binder, the organic solvent and the collector are not specifically limited, and may be selected from a variety of materials.

In the present invention, in combining the positive electrode and the negative electrode, it is necessary that the relationship: $0.9 \leq Kp/Kn \leq 1.1$ is satisfied, where the initial efficiency of the positive electrode is represented by Kp and the initial efficiency of the negative electrode is represented by Kn. If the ratio Kp/Kn of the initial efficiency of the positive electrode to the initial efficiency of the negative electrode is smaller than 0.9 or larger than 1.1, there arises a problem that the efficiency/capacity of the battery using these electrodes decreases. In other words, the capacity of the battery will not be large even if only one of the positive and negative electrodes has a large initial efficiency. In the present invention, it is more preferable that Kp and Kn satisfy the relationship: $0.95 \leq Kp/Kn \leq 1.05$.

The initial efficiency of each of the positive and negative electrodes can be adjusted in accordance with the characteristics of the active material itself. For example, in the positive electrode, the initial efficiency will decrease if the value of x in $Li_xNi_yM_zO_2$ increases. Also, the initial efficiency can be increased by reducing the amount of defects in the crystal. In the negative electrode, the initial efficiency can be adjusted by attaching, on the negative electrode surface, a substance that reacts with lithium to form a compound. The initial efficiency will also change in accordance with the specific surface area, the shape, and the calcining condition of the active material. As for the internal structure, the initial efficiency can be changed by introducing an element other than carbon to the inside. Also, the initial efficiency can be adjusted by mixing a material having a different initial efficiency and changing its mixing ratio.

The initial efficiency of each of the positive and negative electrodes can also be adjusted in accordance with the kind and amount of the electrically conductive agent, the amount of the binder, the pressure in the calendering process, the degree of dispersion in the active material mixture-coating material, and the like. For example, the initial efficiency of the electrode can be increased by increasing the amount of the electrically conductive agent while avoiding decrease in the electrode capacity, by decreasing the amount of the binder while maintaining the strength and the adhesion of the active material layer, or by raising the pressure in the calendering process. The reverse of the above-mentioned adjustment can be carried out in order to decrease the initial efficiency of the electrode.

The non-aqueous electrolyte secondary battery of the present invention employs an electrolytic solution obtained by dissolving, in an organic solvent, a lithium salt to be used as a supporting electrolyte.

The organic solvent to be used is not specifically limited. As the organic solvent, propylene carbonate, ethylene carbonate, dimethoxy ethane, γ-butyrolactone, tetrahydrofuran, diethyl carbonate, methyl ethyl carbonate, dipropyl carbonate, and the like are used either alone or as a mixture of two or more kinds thereof.

The supporting electrolyte to be used is not specifically limited. As the supporting electrolyte, $LiClO_4$, $LiAsF_6$, $LiPF_6$, $LiBF_4$, and the like are used either alone or as a mixture of two or more kinds thereof.

The non-aqueous electrolyte secondary battery can have a variety of configurations. For example, besides the coin-type battery, the battery can have a configuration such that a jelly roll prepared by using a positive electrode, a negative electrode, and a separator is housed in a round or square can.

MODE FOR CARRYING OUT THE INVENTION

Figure 1:
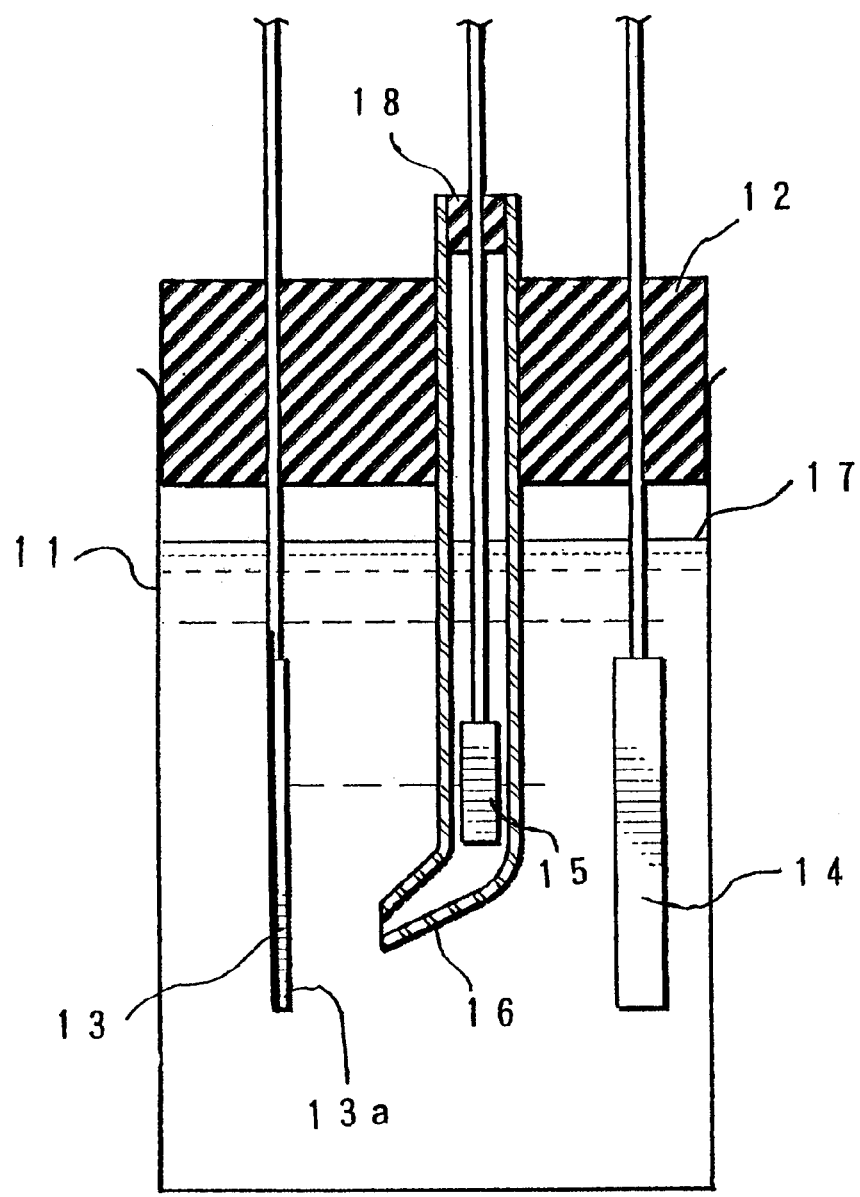
FIG. 1 is a schematic view illustrating a cell for measuring the positive electrode characteristics and the negative electrode characteristics used in examples of the present invention.

Hereafter, the present invention will be more specifically explained by examples shown below. However, the present invention is not limited by these examples.

EXAMPLE 1

Preparation of Positive Electrode

Nickel nitrate and cobalt nitrate were mixed in an aqueous solution in a ratio of Ni/Co (molar ratio)=0.8/0.2 to form a precipitate, which was dried by a spray dryer to yield approximately spherical particles. These particles and lithium hydroxide were mixed in a ratio of Li/Ni/Co (molar ratio)=1/0.8/0.2, and the resultant mixture was calcined. The obtained particles had a particle size of 15 μm.

This lithium composite oxide $LiNi_{0.8}Co_{0.2}O_2$ was used as an active material to prepare a positive electrode mixture-coating material having a blending composition as shown below.

Composition of Blending
Positive Electrode Active Material:

| | |
|---|---|
| The above $LiNi_{0.8}Co_{0.2}O_2$ | 93 parts by weight |
| Electrically conductive agent: | |
| Graphite KS44 (manufactured by LONZA) | 4 parts by weight |
| Binder: Elf-Atochem Japan KYNAR 741 polyvinylidene fluoride (PVDF) | 3 parts by weight |
| Solvent: N-methyl-2-pyrrolidone (NMP) | 67 parts by weight |

PVDF (3 parts by weight) was dissolved in NMP (27 parts by weight) to prepare a binder solution (30 parts by weight). The active material (93 parts by weight) and the electrically conductive agent (4 parts by weight) were mixed in dry process by a hypermixer, and the mixture was introduced into a pressure kneader. The above-mentioned binder solution (13 parts by weight) was added to the mixture, and the resultant was kneaded for 30 minutes while cooling the jacket of the pressure kneader with water. The kneaded product was taken out, and the binder solution (17 parts by weight) and NMP (40 parts by weight) were added to dissolve the product in the hypermixer to give an active material mixture-coating material.

The prepared mixture coating-material was applied onto one surface of a collector made of aluminum foil of 20 μm thickness by means of a blade coater and dried. Then, the obtained coated collector was calendered by a roller press machine and cut into a given size to prepare an electrode (P1) containing the active material at 3 g/cm³ in a unit volume and having a mixture layer of 67 μm thickness.

Evaluation of Positive Electrode Characteristics

The electrode (P1) was cut into a rectangular shape of 25 mm×20 mm. Then, an upper portion of the electrode layer was removed by a width of 5 mm to leave an electrode layer of 20 mm square. A stainless steel wire was spot-welded as a lead wire onto the upper portion of the electrode where the electrode layer was removed. Further, a lacquer of PVDF was applied onto a rear surface of the electrode (i.e. onto a surface of the collector where the active material layer was not formed) and dried to form a PVDF coating film, thus preparing an electrode for evaluation (working electrode).

A cell for measuring the charge/discharge capacities was prepared as shown in FIG. 1, and the charge/discharge operations were carried out in the following manner.

Namely, with reference to FIG. 1, in a beaker (11) were disposed the electrode (13) prepared in the above step, an counter electrode (14) formed of a lithium plate connected to a stainless steel wire so as to face the surface of the electrode (13) on which the active material layer (13a) was formed, and a Capillary tube (16) having a similar reference electrode (15). An electrolytic solution (17) was prepared by dissolving 1 mol/liter of lithium perchlorate as an electrolyte salt in a mixture solvent containing ethylene carbonate and diethyl carbonate at 1:1 (volume ratio). The beaker (11) and the Capillary tube (16) were sealed with silicon plugs (12) and (18), respectively, to prepare the cell for measurement.

This cell was charged under a condition with a constant current of 1 mA and an final voltage of 4.2 V (potential vs. Li/Li$^+$) and was discharged under a condition with a constant current of 1 mA and an final voltage of 3.0 V (potential vs. Li/Li$_+$) to determine the charge/discharge capacities. The discharge capacity of the positive electrode was 188 mA/g, and the initial efficiency was $K_{p1}$=(initial discharge capacity)/(initial charge capacity)=0.88.

Preparation of Negative Electrode

A negative electrode mixture-coating material having a blending composition as shown below was prepared.

Composition of Blending

Negative electrode active material:

| | |
|---|---|
| Hard carbon (with an average particle diameter of 11 μm) | 82 parts by weight |
| Electrically conductive agent: Graphite KS25 (manufactured by LONZA) | 9 parts by weight |
| Binder: Elf-Atochem Japan KYNAR 741 polyvinylidene fluoride (PVDF) | 9 parts by weight |
| Solvent: N-methyl-2-pyrrolidone (NMP) | 150 parts by weight |

PVDF (9 parts by weight) was dissolved in NMP (81 parts by weight) to prepare a binder solution (90 parts by weight). The active material (82 parts by weight) and the electrically conductive agent (9 parts by weight:) were mixed in dry process by a hypermixer, and the mixture was introduced into a pressure kneader. The above-mentioned binder solution (50 parts by weight) was added to the mixture, and the resultant was kneaded for 60 minutes while cooling the jacket of the pressure kneader with water. The kneaded product was taken out, and the binder solution (40 parts by weight) and NMP (69 parts by weight) were added to dissolve the product in the hypermixer to give an active material mixture-coating material.

The prepared mixture-coating material was applied onto one surface of a collector made of rolled copper foil of 18 μm thickness by means of a blade coater and dried. Then, the obtained coated collector was calendered by a roller press machine and cut into a given size to prepare an electrode (N1) containing the active material at 1 g/cm$^3$ in a unit volume and having a mixture layer of 83 μm thickness.

Evaluation of Negative Electrode Characteristics

The electrode (N1) was cut into a rectangular shape of 25 mm×20 mm. Then, an upper portion of the electrode layer was removed by a width of 5 mm to leave an electrode layer of 20 mm square. A stainless steel wire was spot-welded as a lead wire onto the upper portion of the electrode where the electrode layer was removed. Further, a lacquer of PVDF was applied onto a rear surface of the electrode (i.e. onto a surface of the collector where the active material layer was not formed) and dried to form a PVDF coating film, thus preparing an electrode for evaluation (working electrode).

A cell similar to the one shown in FIG. 1 for measuring the charge/discharge capacities was prepared. Namely, a cell was prepared in a similar manner except that the above-mentioned electrode for evaluation was disposed instead of the electrode (13) shown in FIG. 1. In this cell, the counter electrode (14) was disposed to face the surface of the electrode for evaluation where the active material layer was formed.

This cell was discharged under a condition with a constant current of 1 mA and an final voltage of 0.0 V (potential vs. Li/Li$^+$) and was charged under a condition with a constant current of 1 mA and an final voltage of 2.0 V (potential vs. Li/Li$^+$) to determine the charge/discharge capacities. The charge capacity of the negative electrode, was 398 mA/g, and the initial efficiency was $K_{N1}$=(initial charge capacity) (initial discharge capacity)=0.81.

Fabrication of Battery and Evaluation of Battery Characteristics

Figure 2:
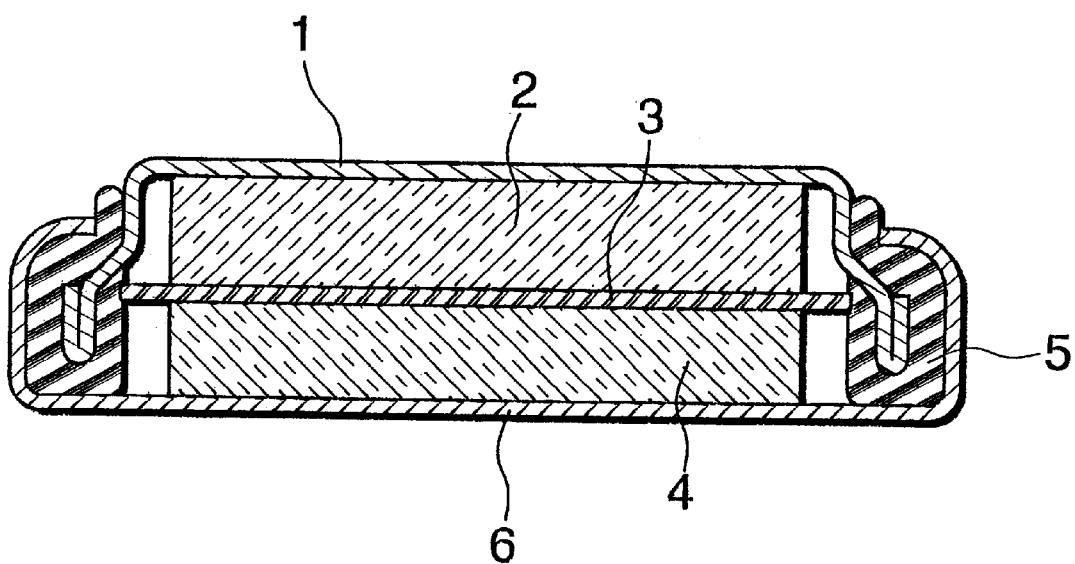
FIG. 2 is a cross-sectional view illustrating a coin-type battery as an example of a non-aqueous electrolyte secondary battery of the present invention

The positive electrode (P1) and the negative electrode (N1) were used to fabricate a coin-type battery as shown in FIG. 2 as an example of a non-aqueous electrolyte secondary battery.

The positive electrode (P1) was cut into a circular shape with a diameter of 15 mm, and the negative electrode (N1) was cut into a circular shape with a diameter of 15.5 mm. Further, a non-aqueous electrolytic solution was prepared by dissolving LiPF$_6$ at a concentration of 1 mol/liter in a mixture solvent containing ethylene carbonate and diethyl carbonate at a ratio of 1:1 (volume ratio).

A coin-type battery having a diameter of 20 mm×thickness of 2.5 mm was prepared, as shown in FIG. 2, by using the non-aqueous electrolytic solution, the positive electrode, the negative electrode, a thin film separator made of polypropylene, a negative electrode cup, a positive electrode can, and a gasket. In the coin-type battery of FIG. 2, the positive electrode (P1) (4) housed in the positive electrode can (6) and the negative electrode (N1) (2) housed in the negative electrode cup (1) are laminated through the intermediary of the separator (3); and the positive electrode can (6) and the negative electrode cup (1) are caulked and sealed through the intermediary of the gasket (5). In FIG. 2, the collector is not shown.

The battery thus fabricated was charged under a charge current of 1 mA until the battery voltage reached 4.2 V, and thereafter the battery was charged under a condition with a charge time of 20 hours so that the battery voltage was 4.2 V. Then, the battery was discharged under a condition with a discharge current of 1mA and an final voltage of 2.5 V to determine its discharge capacity. The capacity as measured was 5.9 mAh.

EXAMPLE 2

Preparation of Positive Electrode

An electrode (P2) containing the active material at 3 g/cm$^3$ in a unit volume and having a mixture layer of 64 μm thickness was prepared in the same manner as in Example 1 except that $Li_{1.17}Ni_{0.8}Co_{0.2}O_2$ was used as the active material instead of $LiNi_{0.8}Co_{0.2}O_2$ used in Example 1. The discharge capacity of the positive electrode was 187 mA/g, and the initial efficiency was $K_{P2}=0.72$.

Preparation of Negative Electrode

An electrode (N2) containing the active material at 1 g/cm$^3$ in a unit volume and having a mixture layer of 86 μm thickness was prepared in the same manner as in Example 1 except that hard carbon (having an average particle diameter of 4.2 μm) was used as the active material instead of the hard carbon (having an average particle diameter of 11 μm) used in Example 1. The charge capacity of the negative electrode was 397 mA/g, and the initial efficiency was $K_{N2}=0.72$.

Fabrication of Battery and Evaluation of Battery Characteristics

The positive electrode (P2) and the negative electrode (N2) were used to fabricate a coin-type battery in the same manner as in Example 1. The discharge capacity as measured was 6.0 mAh.

EXAMPLE 3

Preparation of Positive Electrode

An electrode (P3) having the same composition as that of Example 2, containing the active material at 3 g/cm$^3$ in a unit volume, and having a mixture layer of 60 μm thickness was prepared. The discharge capacity of the positive electrode was 187 mA/g, and the initial efficiency was $K_{P3}=0.72$.

Preparation of Negative Electrode

An electrode (N3) containing the active material at 1 g/cm$^3$ in a unit volume and having a mixture layer of 90 μm thickness was prepared in the same manner as in Example 1 except that a mixture of 64 parts by weight of the hard carbon (having an average particle diameter of 11 μm) used in Example 1 and 16 parts by weight of the hard carbon (having an average particle diameter of 4.2 μm) used in Example 2 was used as the active material. The charge capacity of the negative electrode was 398 mA/g, and the initial efficiency was $K_{N3}=0.79$.

Fabrication of Battery and Evaluation of Battery Characteristics

The positive electrode (P3) and the negative electrode (N3) were used to fabricate a coin-type battery in the same manner as in Example 1. The discharge capacity as measured was 5.8 mAh.

EXAMPLE 4

Preparation of Positive Electrode

An electrode (P4) containing the active material at 3 g/cm$^3$ in a unit volume and having a mixture layer of 65 μm thickness was prepared in the same manner as in Example 1 except that a mixture of 74 parts by weight of $LiNi_{0.8}Co_{0.2}O_2$ used in Example 1 and 19 parts by weight of $Li_{1.17}Ni_{0.8}Co_{0.2}O_2$ used in Example 2 was used as the active material. The discharge capacity of the positive electrode was 188 mA/g, and the initial efficiency was $K_{P4}=0.85$.

Preparation of Negative Electrode

A negative electrode mixture-coating material having the same blending composition as the one used in Example 1 was applied onto one surface of a collector made of rolled copper foil of 18 μm thickness by means of a blade coater and dried. Then, the obtained coated collector was calendered by a roller press machine and cut into a given size to prepare an electrode (N4) containing the active material at 1 g/cm$^3$ in a unit volume and having a mixture layer of 85 μm thickness. The charge capacity of the negative electrode was 398 mA/g, and the initial efficiency was $K_{N4}=0.81$.

Fabrication of Battery and Evaluation of Battery Characteristics

The positive electrode (P4) and the negative electrode (N4) were used to fabricate a coin-type battery in the same manner as in Example 1. The discharge capacity as measured was 6.0 mAh.

Comparative Example 1

Preparation of Positive Electrode

A positive electrode mixture-coating material having the same blending composition as the one used in Example 1 was applied onto one surface of a collector made of aluminum foil of 20 μm thickness by means of a blade coater and dried. Then, the obtained coated collector was calendered by a roller press machine and cut into a given size to prepare an electrode (P5) containing the active material at 3 g/cm$^3$ in a unit volume and having a mixture layer of 71 μm thickness. The discharge capacity of the positive electrode was 188 mA/g, and the initial efficiency was $K_{P5}=0.88$.

Preparation of Negative Electrode

A negative electrode mixture-coating material having the same blending composition as the one used in Example 2 was applied onto one surface of a collector made of rolled copper foil of 18 μm thickness by means of a blade coater and dried. Then, the obtained coated collector was calendered by a roller press machine and cut into a given size to prepare an electrode (N5) containing the active material at 1 g/cm$^3$ in a unit volume and having a mixture layer of 79 μm thickness. The charge capacity of the negative electrode was 397 mA/g, and the initial efficiency was $K_{N5}=0.72$.

Fabrication of Battery and Evaluation of Battery Characteristics

The positive electrode (P5) and the negative electrode (N5) were used to fabricate a coin-type battery in the same manner as in Example 1. The discharge capacity as measured was 5.6 mAh.

Comparative Example 2

Preparation of Positive Electrode

A positive electrode mixture-coating material having the same blending composition as the one used in Example 2 was applied onto one surface of a collector made of aluminum foil of 20 μm thickness by means of a blade coater and dried. Then, the obtained coated collector was calendered by a roller press machine and cut into a given size to prepare an electrode (P6) containing the active material at 3 g/cm$^3$ in a unit volume and having a mixture layer of 60 μm thickness. The discharge capacity of the positive electrode was 187 mA/g, and the initial efficiency was $K_{P6}=0.72$.

Preparation of Negative Electrode

A negative electrode mixture-coating material having the same blending composition as the one used in Example 1 was applied onto one surface of a collector made of rolled copper foil of 18 μm thickness by means of a blade coater and dried. Then, the obtained coated collector was calendered by a roller press machine and cut into a given size to prepare an electrode (N6) containing the active material at 1 g/cm$^3$ in a unit volume and having a mixture layer of 90 μm thickness. The charge capacity of the negative electrode was 398 mA/g, and the initial efficiency was $K_{N6}=0.81$.

Fabrication of Battery and Evaluation of Battery Characteristics

The positive electrode (P6) and the negative electrode (N6) were used to fabricate a coin-type battery in the same manner as in Example 1. The discharge capacity as measured was 5.6 mAh.

The above results are shown together in Table 1.

TABLE 1

| | Positive Electrode | | | Negative Electrode | | | Capacity |
| | No. | Thickness (μm) | Initial Efficiency Kp | No. | Thickness (μm) | Initial Efficiency Kn | Kp/Kn | of Battery (mAh) |
|---|---|---|---|---|---|---|---|---|
| Example 1 | P1 | 67 | 0.88 | N1 | 83 | 0.81 | 1.086 | 5.9 |
| Example 2 | P2 | 64 | 0.72 | N2 | 86 | 0.72 | 1.000 | 6.0 |
| Example 3 | P3 | 60 | 0.72 | N3 | 90 | 0.79 | 0.911 | 5.8 |
| Example 4 | P4 | 65 | 0.85 | N4 | 85 | 0.81 | 1.049 | 6.0 |
| Comparative Example 1 | P5 | 71 | 0.88 | N5 | 79 | 0.72 | 1.222 | 5.6 |
| Comparative Example 2 | P6 | 60 | 0.72 | N6 | 90 | 0.81 | 0.889 | 5.6 |

From Table 1, it is understood that the batteries of Examples 1 to 4 each have a large capacity and are excellent. Especially, in Example 2, the capacity of the battery is large though the initial efficiencies of the positive and negative electrodes are each 0.72 which is not so good. The batteries of Comparative Examples 1 to 2 have a smaller capacity than those of the Examples because the combination of the positive electrode and the negative electrode is not good.

In the Examples, a coin-type battery was fabricated as an example of a non-aqueous electrolyte secondary battery. However, batteries with various shapes, such as cylindrical type, pin-type, and paper-type batteries, may be fabricated by utilizing the present invention. Accordingly, the above examples are described merely for illustrative purposes and these should not be construed as restrictive. Further, any modification within the equivalent to the claims is intended to fall under the scope of the present invention.

INDUSTRIAL APPLICABILITY

As shown above, the non-aqueous electrolyte secondary battery of the present invention has a large capacity with excellent charge/discharge characteristics, since the positive electrode and the negative electrode are combined so that the relationship: $0.9 \leq Kp/Kn \leq 1.1$ is satisfied, where the initial efficiency of the positive electrode is represented by Kp and the initial efficiency of the negative electrode is represented by Kn.

The present invention contributes to increase of capacity and improvement of charge/discharge characteristics of non-aqueous electrolyte secondary batteries.

What is claimed is:

1. A non-aqueous electrolyte secondary battery comprising a positive electrode and a negative electrode each capable of being doped and undoped with lithium ions, wherein the positive electrode and the negative electrode are combined so that the relationship:

$$0.9 \leq (Kp/Kn) \leq 1.1$$

is satisfied, where an initial efficiency of the positive electrode is represented by Kp and an initial efficiency of the negative electrode is represented by Kn, wherein Kp=(initial discharge capacity of the positive electrode)/(initial charge capacity of the positive electrode), and wherein Kn=(initial charge capacity of the negative electrode)/(initial discharge capacity of the negative electrode).

2. A non-aqueous electrolyte secondary battery according to claim 1, wherein an active material of the positive electrode comprises a lithium composite oxide having a composition of $Li_xNi_yM_zO_2$, where x satisfies $0.8 < x < 1.5$, y+z satisfies $0.8 < y+z < 1.2$, z satisfies $0 \leq z < 0.35$, and M is at least one element selected from the group consisting of Co, Mg, Ca, Sr, Al, Mn and Fe.

3. A method of preparing a non-aqueous electrolyte secondary battery comprising a positive electrode and a negative electrode each capable of being doped and undoped with lithium ions, comprising:

adjusting a) an initial efficiency Kp of the positive electrode, wherein Kp=(initial discharge capacity of the positive electrode)/(initial charge capacity of the positive electrode); and b) an initial efficiency Kn of the negative electrode, wherein Kn=(initial charge capacity of the negative electrode)/(initial discharge capacity of the negative electrode); such that the positive electrode and the negative electrode are combined only when a relationship $0.9 \leq (KP/Kn) \leq 1.1$ is satisfied.

4. The method of claim 3 wherein the initial efficiency Kp is adjusted by adjusting the amount of crystal defects.

5. The method of claim 3 wherein the initial efficiency Kn is adjusted by attaching, on a surface of the negative electrode, a substance that reacts with lithium.

6. The method of claim 3 wherein the initial efficiency Kp or Kn is adjusted by adjusting the specific surface area, the shape or the calcining condition of the active material; by introducing an element other than carbon, by adding a material having a different initial efficiency, by adjusting the kind and amount of electrically conductive agent or binder; by adjusting pressure in a calendaring step; or by adjusting a degree of dispersion in the active material mixture-coating material.

7. The method of claim 3 wherein an active material of the positive electrode material comprises a lithium composite oxide having a composition of $Li_xNi_yM_zO_2$, where x satisfies $0.8 < x < 1.5$, y+z satisfies $0.8 < y+z < 1.2$, z satisfies $0 \leq z < 0.35$, and M is at least one element selected from the group consisting of Co, Mg, Ca, Sr, Al, Mn and Fe.

8. The method of claim 3, wherein the relationship of $0.95 \leq (Kp/Kn) \leq 1.05$ is satisfied.

9. A non-aqueous electrolyte secondary battery formed by the method of claim 3.

* * * * *